United States Patent [19]
Giacobbe et al.

[11] Patent Number: 6,098,139
[45] Date of Patent: Aug. 1, 2000

[54] FREQUENCY INDEPENDENT ASYNCHRONOUS CLOCK CROSSING FIFO

[75] Inventors: Paul J. Giacobbe, Townsend; Robert P. Ryan, Marlborough, both of Mass.

[73] Assignee: 3Com Corporation, Santa Clara, Calif.

[21] Appl. No.: 09/085,606

[22] Filed: May 27, 1998

[51] Int. Cl.[7] .............................. G06F 13/00; G06F 1/04
[52] U.S. Cl. ........................... 710/129; 710/130; 710/58; 710/61; 713/400; 713/600
[58] Field of Search ............................ 395/872; 711/167, 711/173; 365/221, 189.01; 364/550; 710/129, 130, 29, 46, 52, 57, 61, 60, 58; 713/600, 400; 377/66, 69; 326/12, 101

[56] References Cited

U.S. PATENT DOCUMENTS

| | | | |
|---|---|---|---|
| 4,649,512 | 3/1987 | Nukiyama | 710/130 |
| 5,121,346 | 6/1992 | McClure | 364/550 |
| 5,206,817 | 4/1993 | McClure | 364/550 |
| 5,347,559 | 9/1994 | Hawkins et al. | 377/54 |
| 5,365,485 | 11/1994 | Ward et al. | 365/221 |
| 5,473,756 | 12/1995 | Traylor | 395/250 |
| 5,502,655 | 3/1996 | McClure | 364/550 |
| 5,555,524 | 9/1996 | Castellano | 365/221 |
| 5,600,824 | 2/1997 | Williams et al. | 710/129 |
| 5,602,878 | 2/1997 | Cross | 375/354 |
| 5,668,767 | 9/1997 | Barringer | 365/221 |
| 5,905,766 | 5/1999 | Nguyen | 375/354 |
| 5,909,701 | 6/1999 | Jeddeloh | 711/167 |
| 5,926,838 | 7/1999 | Jeddeloh | 711/167 |
| 6,029,253 | 2/2000 | Houg | 713/600 |

*Primary Examiner*—Thomas C. Lee
*Assistant Examiner*—Katharina Schuster
*Attorney, Agent, or Firm*—Weingarten, Schurgin, Gagnebin & Hayes LLP

[57] ABSTRACT

A clock crossing FIFO capable of functioning regardless of relative clock frequencies on the write and read sides. Toggle signals are utilized to cross the clock boundaries. The number of write counts which have been accrued but not acknowledged by the read side are tracked, and this number is stored as of the issuance of a write toggle. Upon toggle receipt on the read side, this number is latched as a measure of the number of data units which can be read from the FIFO. At the same time, the toggle is returned to the write side for decrementing the number of write counts outstanding by the number conveyed to the read side. Similar circuitry is employed for conveying to the write side circuitry the number of data units which have been read by the read side circuitry. The presently disclosed FIFO and associated circuitry operates independent of relative clock speeds, and the particular size of the FIFO is scalable.

20 Claims, 4 Drawing Sheets

FREQUENCY INDEPENDENT ASYNCHRONOUS CLOCK CROSSING FIFO

CROSS REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

The invention generally relates to the field of memories for digital electronics, and specifically to first-in, first-out (FIFO) memories having disparate write and read clock frequencies.

A FIFO can be used to transfer data from one clock domain to another. Such FIFOs are sometimes referred to as "clock crossing FIFOs." Depending upon the relative clock frequencies, prior art clock crossing FIFOs have utilized indications set by the "write" side circuitry to inform the "read" side circuitry that at least one data unit has been written and is now available for reading. One form of such a prior art indication involves a comparison of write and read addresses. With reference to FIG. 1, the write address (WR_PTR) increments in order to write the next data unit. A comparator compares the write address (WR_PTR), which has been incremented, to the read address (RD_PTR), which has not incremented. The inverted output of the comparator will therefore be set to logic one. This state can then be utilized by the read circuitry as an indicator that at least one data unit is now available for reading.

For prior art systems employing such a comparison between write pointer address and read pointer address to derive an indication of whether a data unit is ready to be read, the write pointer may be conveyed across the clock boundary using a double synchronized flip-flop circuit, such as that illustrated in FIG. 1. In this example, the write side circuitry is running at a clock rate of 25 MHz, while the read circuitry is running at 33 MHz. Four flip flops ("FF1A", "FF1B", "FF2A", "FF2B" in FIG. 1) are required, two for each bit in the two-bit WR_PTR. The reason for using two flip flops for each bit is that a first flip flop may enter a "metastable" state when an input, arriving according to a first clock rate, is clocked into the flip flop running at a second clock rate.

With reference to FIGS. 2A and 2B, the metastable state results when a change in state at the input ("D") of a flip flop occurs within less than a specified set-up time ($T_{SU}$), or a change in state at the input occurs within less than a specified hold time ($T_H$). These times are specified by the flip flop manufacturer. The timing diagrams in these figures apply to either FF1A and FF2A, or FF1B and FF2B. The first flip flops ("FF1A" or "FF1B") are used to establish either a high or low state at the respective output ("Q") on a first clock cycle following a change in state at the input. Because of the possibility of metastability, this output is not reliable on the first clock cycle; in FIG. 2B, the output of the first flip flop settled in a logic "low" state even though the input is in a logic "high" state. The second flip flop will latch either a low or high state, but eliminates the possibility that a metastable state will be observed by the circuitry on the read side.

In FIG. 2A, the second flip flop latches the change in the WR_PTR value on the second rising clock edge following assertion of WR_PTR, resulting in a change in the comparator. However, in FIG. 2B, the second flip flop latches the change in WR_PTR on the third clock cycle. This potential for delay must be accounted for in the read circuitry.

A further problem exists if the normal progression of binary numbers is utilized for the WR_PTR. The write pointer values would normally progress in the following order: 00, 01, 10, 11. However, this progression has two instances where both bits are changing, between 01 and 10, and between 11 and 00. If it is possible that both bits might change value, it will be impossible to tell for sure if a change in WR_PTR was the result of multiple writes, or due to metastability.

One way to address this problem is to employ a Gray Code sequence, such as: 00, 01, 11, 10. Here, only one bit changes at a time, so it is possible to determine if one of the flip flops has become metastable. However, this approach only works if the write side clock frequency is less than the read side clock frequency. Otherwise, if the write side clock frequency were, for instance, at least twice as fast as the read side clock frequency, it would be possible for the write address to change twice, thus defeating the ability to determine if one of the flip flops has become metastable since the write address may increment more than once before the read side circuitry can check it.

To address this problem, the prior art has doubled the necessary FIFO memory width, and divided down the write side clock frequency by two. Depending upon the relative clock frequencies, additional buffering and clock division may be required.

Illustrated in FIG. 3 is a further prior art configuration used by a write side circuit for signalling a read side circuit that at least one data unit is available for reading in an associated memory. Here, a first flip flop, labelled "FF1" receives a toggle signal, "T", reflecting that a data unit has been written to the memory and is now available for reading. FF1 is clocked at the write side clock rate, or 25 MHZ in the illustrated example. When latched by FF1, the Q output of FF1 goes to a high state, and the Q-inverted output goes low. This Q-inverted output is looped back to the input to reset FF1 on the next clock cycle.

The Q output of FF1 is latched on the next clock cycle of the read clock, here running at 33 MHZ. As described above, this may result in a metastable state for FF2, depending upon when the output of FF1 occurs relative to the rising edge of the read side clock. For this reason, FF3 is employed to isolate the read side circuitry from the metastable condition, as previously described.

One of the benefits of this circuit is that it accommodates the transfer of the toggle signal across the clock boundary, as opposed to transferring the entire write address. It also avoids the need to provide write-read address comparison circuitry, instead relying upon the assertion of a single toggle bit.

The drawbacks of this circuit are much the same as the circuit of FIG. 1, however. Specifically, the circuit of FIG. 3 only works in the case where the write side clock frequency is less than the read side clock frequency. Otherwise, the toggle may be reset before FF2 has latched it at the read side clock frequency.

All of the foregoing configurations must be customized according to the particular clock frequencies expected on either side of the FIFO. The prior art has thus failed to provide a clock-crossing FIFO and associated circuitry which accommodates data writes and reads regardless of clock frequencies on the respective sides.

BRIEF SUMMARY OF THE INVENTION

The presently disclosed invention provides a clock crossing FIFO capable of functioning regardless of relative clock frequencies on the write and read sides. Toggle signals are employed in order to avoid the necessity of latching an entire write address across the clock boundary, such as shown for an address of limited width in FIG. 1. However, in contrast to prior art, the presently disclosed invention avoids the restriction on relative clock frequencies suffered by the circuit of FIG. 3, whereby the write side clock frequency must be less than the read side clock frequency.

As disclosed, the present clock crossing FIFO has associated with it circuitry which tracks a number of write counts, or data units written to the FIFO, which have been accrued but not acknowledged by the read side circuit. Associated with this write count circuitry is a circuit which captures a number of write counts to be acknowledged by the read side circuitry at the time a toggle signal is sent to the read side circuitry. It is this toggle signal which crosses the clock boundary.

Upon receipt on the read side, the toggle causes the captured number of write counts to be latched and made available to the read circuitry as a measure of the number of data units which have been written to memory and which can now be read from the FIFO. At the same time, the toggle is returned to the write side circuitry for the purpose of acknowledging the transfer of the write count and once again sending to the read side circuitry an indication of how many data units have been written to the FIFO and are available for reading as of the time of issuance of the next toggle. Through this mechanism, the read side circuitry is made aware of the write side status at the time a toggle bit is issued, thus avoiding restrictions as to relative clock frequencies on the write and read sides.

A similar arrangement is employed for conveying to the write side circuitry the number of data units which have been read by the read side circuitry. Specifically, once the read side circuitry has become aware of data units written into the FIFO, and has read at least some of them out, a number of data units read but not yet acknowledged by the write side is latched into a register. From this register, a circuit captures a number of data units read, but not yet acknowledged by the write side, as of the time of issuance of a toggle being sent from the read side to the write side. This circuitry essentially mirrors that previously described for the write toggle.

Upon receipt on the write side, the total number of data units written to the memory is decremented accordingly. At the same time, the toggle is returned back across the clock boundary in order to acknowledge to the read circuit that the read count was received.

Significantly, the presently disclosed FIFO and associated circuitry operates independent of relative clock speeds. In a first, illustrated embodiment, the write clock frequency is 50 MHz, and the read side clock frequency is 75 MHz. The associated FIFO is either synchronous or asynchronous, and in the first embodiment is a 256 long word FIFO of approximately 1K bytes. However, it will be understood that the memory size is scalable to meet the demands of any particular implementation.

In a further embodiment in which relative clock frequencies are known, the read toggle circuitry is omitted if the write clock is much slower than the read clock.

BRIEF DESCRIPTION OF THE SEVERAL VIEWS OF THE DRAWING

The invention will be more fully understood by reference to the following description in conjunction with the accompanying drawings of which.

DETAILED DESCRIPTION OF THE INVENTION

Figure 1:
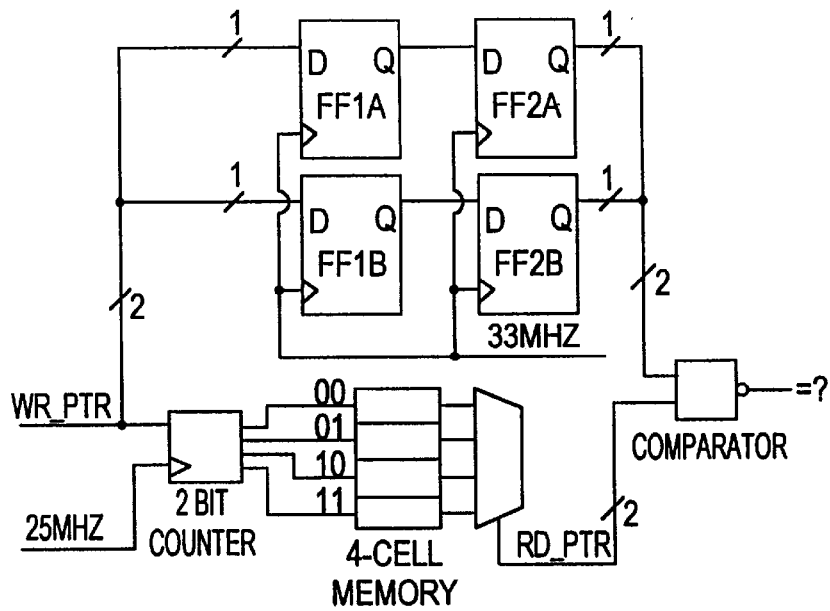
FIG. 1 is a prior art four-cell clock crossing FIFO employing multiple "dual flops" to convey a write address to read side circuitry.
Figure 2A:
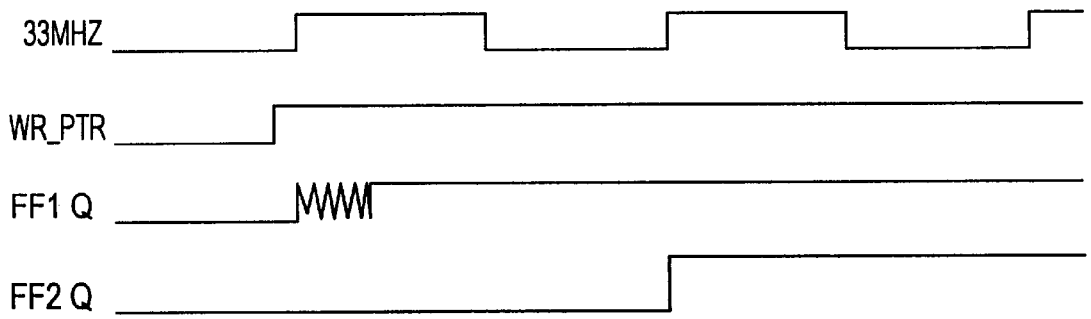
FIGS. 2A and 2B are timing diagrams for the prior art circuit of FIG. 1.
Figure 2B:
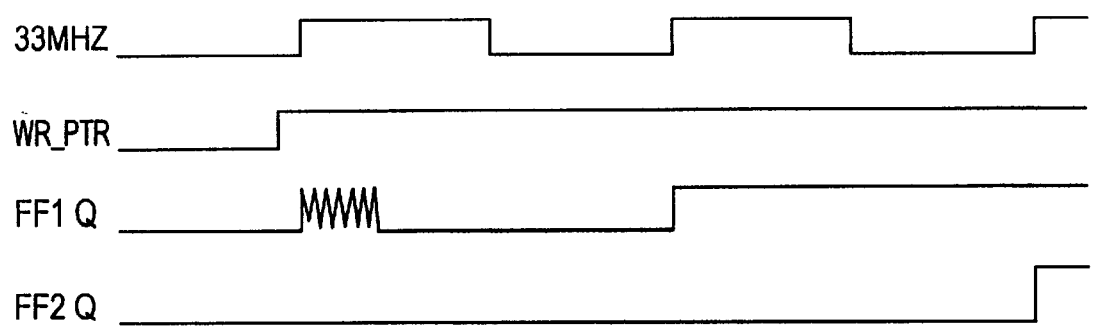
Figure 3:
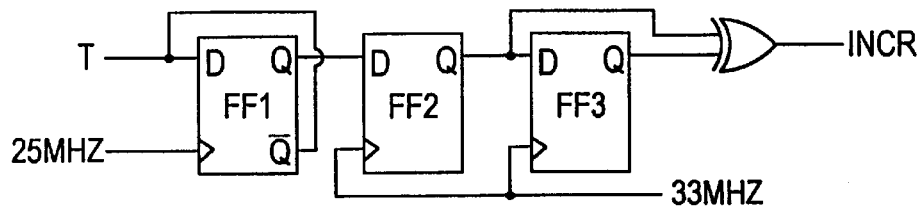
FIG. 3 is a circuit for conveying a toggle across a clock boundary in a prior art clock crossing FIFO.
Figure 4:
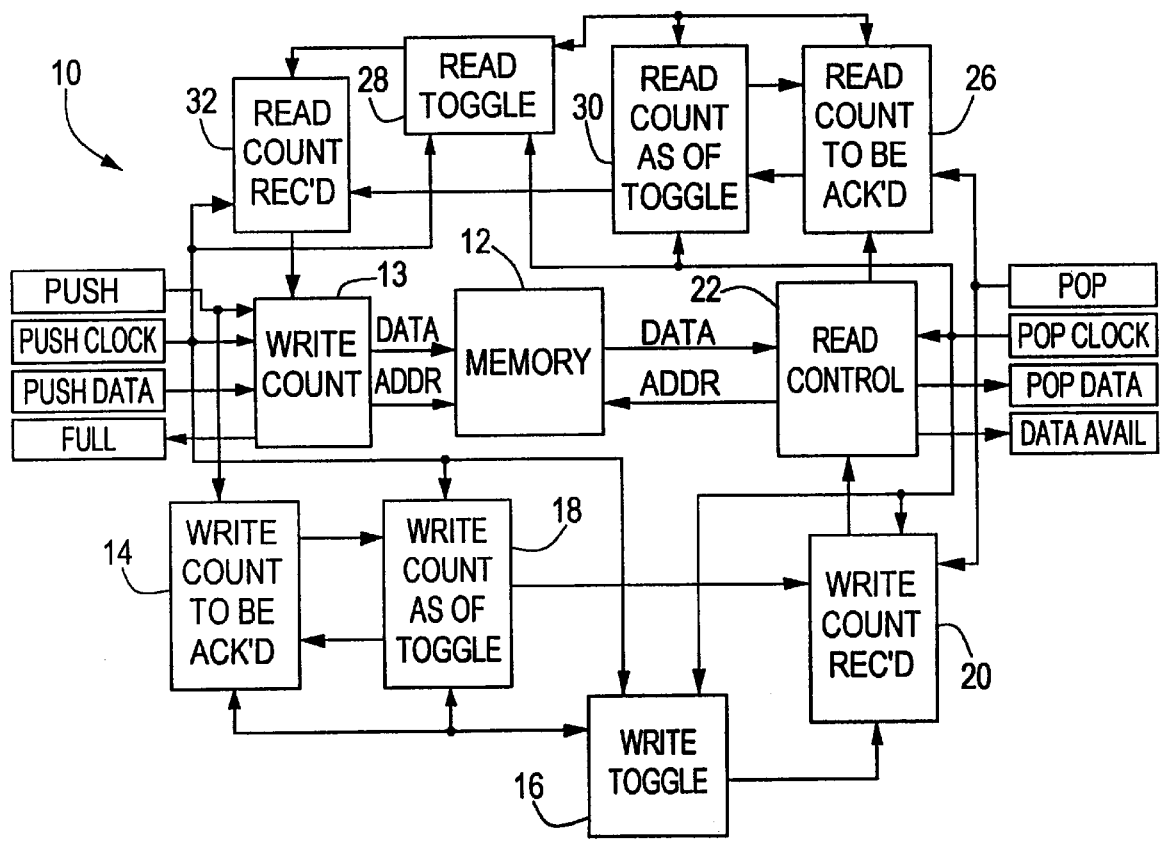
FIG. 4 is a block diagram of a clock crossing FIFO according to the presently disclosed invention.

With reference to FIG. 4, a simplified block diagram of a clock crossing FIFO system 10 according to the present invention is illustrated. Inputs to the system 10 include a PUSH command for causing a data unit to be written to a memory unit 12, a PUSH CLOCK representing a clock associated with the circuitry on a first side of the system 10 (also referred to as the "write side circuitry"), and PUSH DATA representing the data unit or units to be written to the memory 12. An output from the system 10 to the first side circuitry is a FULL indicator for providing an indication that the memory 12 has no room for storing another data unit.

Other inputs to the system 10, from a second side of the system 10, include a POP command for causing a data unit to be read from the memory 12, and a POP CLOCK representing a clock associated with the circuitry on the second side of the system 10 (also referred to as the "read side circuitry"). Outputs from the system 10 to the second side circuitry include POP DATA representing the data unit or units read from the memory 12, and a DATA AVAIL indicator for providing an indication that the memory 12 has data units to be read.

In general overview, the clock crossing FIFO system 10 of FIG. 4 is provided with a WRITE COUNT circuit 13 for tracking the total number of data units written to the memory 12 and not read therefrom. This number is also conveyed to a WRITE COUNT TO BE ACK'D circuit 14 which tracks a number of data units written to the memory, but which haven't been acknowledged by the read side circuitry.

A WRITE TOGGLE circuit 16 is armed when data units have been written to the MEMORY 12 but the existence of which has not yet been acknowledged by the read side circuitry, as indicated by a non-zero value from the WRITE COUNT TO BE ACK'D circuit 14. The toggle indicator is then transferred across the clock boundary to the read side circuitry. The toggle circuit employs both the write side clock and the read side clock, as will be discussed in detail below.

At the same time the toggle indicator is generated by the WRITE TOGGLE circuit 16, the number of data units written to the memory 12 but not yet acknowledged, from the WRITE COUNT TO BE ACK'D circuit 14, is latched in a WRITE COUNT AS OF TOGGLE circuit 18. Thus, a snapshot of the memory state, in terms of data units available to be read, is captured at the time the write toggle is issued to the read side circuitry.

Receipt of the write toggle on the read side causes a WRITE COUNT REC'D circuit 20 to add the number of data units stored in memory as of the time of issuance of the write toggle, from the WRITE COUNT AS OF TOGGLE circuit 18, to its current value. This data is then conveyed to a READ CONTROL circuit 22 which communicates to circuitry associated with the read side whether there are any data units available to be read.

At the same time the WRITE COUNT REC'D circuit 20 is being updated, the toggle indication is returned by the WRITE TOGGLE circuit 16 across the clock boundary to the write side, and specifically to the WRITE COUNT AS OF TOGGLE circuit 18, as an indication that the latched write count has been acknowledged by the read side. In response, the latter circuit 18 returns the count which was transmitted to the WRITE COUNT REC'D circuit 20 at the initiation of the toggle indication to the WRITE COUNT TO BE ACK'D circuit 14 for subtraction from the current value in the WRITE COUNT TO BE ACK'D circuit 14. Thus, once a number of data units written to the memory has been conveyed to the read side, the returned toggle indication causes a reduction in the number of data units not acknowledged by the number conveyed.

The READ CONTROL element 22 on the read side of the system 10 alerts the associated circuitry that at least one data unit has be written to the memory 12 and is now available for reading. This indication is based upon a positive value in the WRITE COUNT REC'D circuit 20, and upon a value from a READ COUNT TO BE ACK'D circuit 26 that a number of data units less than the memory capacity have been read but not acknowledged.

When the associated circuitry reads one or more data units through a POP command, the number of data units read are captured in the READ COUNT TO BE ACK'D circuit 26 which tracks the number of data units read but not yet acknowledged by the write side circuitry. This element has essentially the same function as the WRITE COUNT TO BE ACK'D circuit 14.

Similarly, a READ TOGGLE circuit 28 is responsible for issuing a toggle indication when the number of data units read but not acknowledged is a positive number. This toggle indication crosses the clock boundary and alerts the write side circuitry that one or more data units have been read.

At the same time the toggle is being generated, a READ COUNT AS OF TOGGLE circuit 30 is loaded with the number of data units read but not acknowledged, from the READ COUNT TO BE ACK'D circuit 26. This number is then made available to the write side circuitry, and a READ COUNT REC'D circuit 32 specifically, upon receipt of the toggle indication across the clock boundary.

Once the write side circuitry has been toggled, the toggle is returned across the clock boundary to the read side, where it is used as an acknowledgement of the read count to cause the READ COUNT AS OF TOGGLE circuit 30 value to be decremented from the current value of the READ COUNT TO BE ACK'D circuit 26.

On the write side, the total write count, maintained by the WRITE COUNT circuit 13, is decremented by the number of data units read, as reflected in the new value in the READ COUNT REC'D circuit 32.

In one alternative embodiment to the memory system 10 as illustrated in FIG. 4, the read side circuit clock rate is much faster than the clock rate on the write side. Consequently, there would be no need for read count feedback; one or more data units written would be assumed read once the read side were informed through the toggle circuitry at the bottom of FIG. 4. In this embodiment, elements 26, 28, 30, and 32 would be eliminated, and the total write count maintained in the WRITE COUNT circuit 13 would be decremented by the same amount of data units conveyed to the read side with the write toggle via the WRITE TOGGLE circuit 16, or the value in WRITE COUNT AS OF TOGGLE circuit 18.

Figure 5:
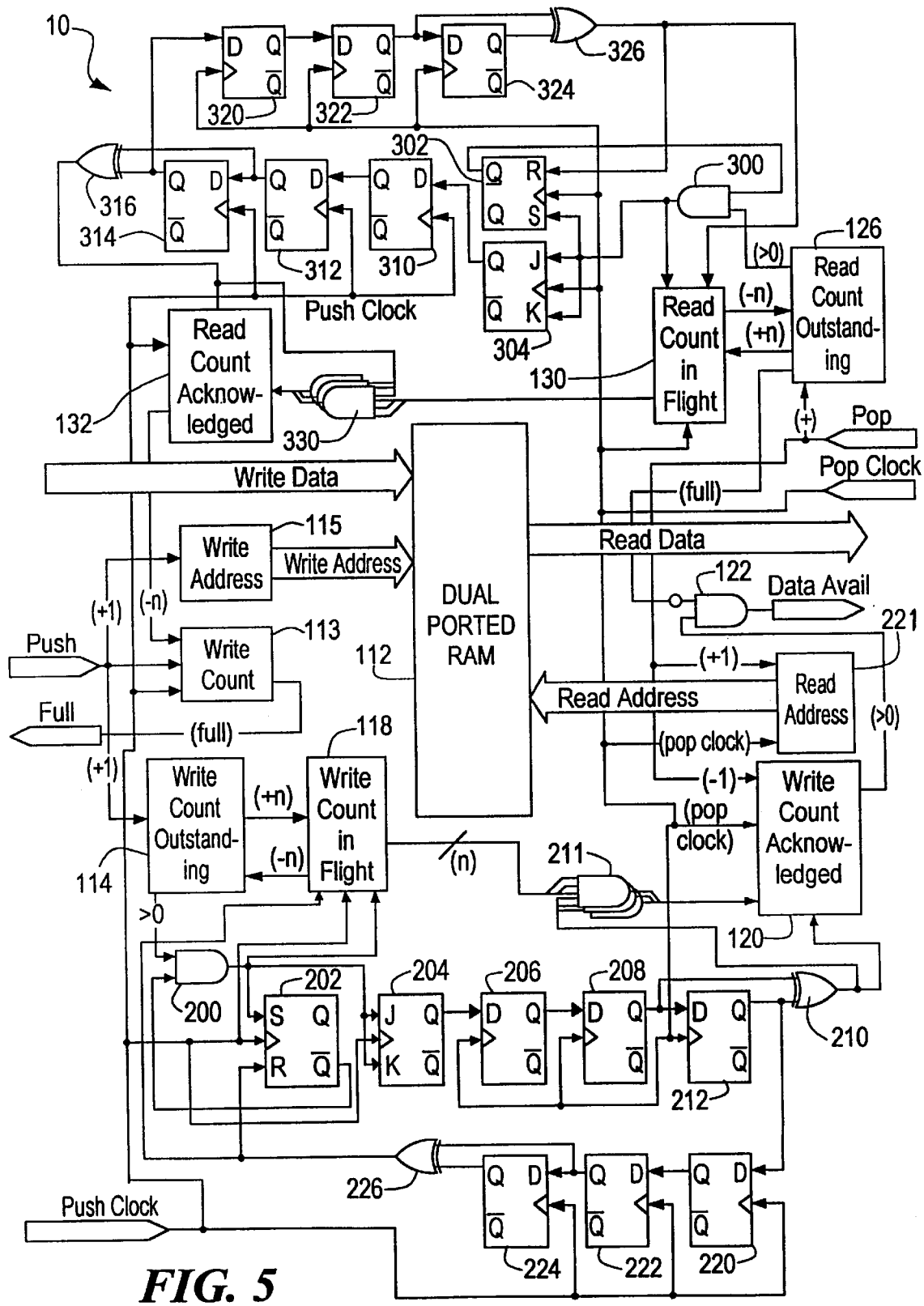
FIG. 5 is a circuit diagram for the clock crossing FIFO of FIG. 4.

The various aspects of the system 10 introduced at an upper level in FIG. 4 will now be described in further detail with respect to FIG. 5. For the sake of simplicity, elements in FIG. 5 which are related to elements in FIG. 4 share the same reference numbers as shown in FIG. 4, but added to 100. Thus, the WRITE COUNT circuit 13 in FIG. 4 includes a WRITE COUNT register 113 in FIG. 5 for maintaining a count of the number of data units written to the memory but not read therefrom. This count is incremented upon receipt of a PUSH command input.

Also incremented by receipt of a PUSH command is a WRITE ADDRESS register 115 which provides address information to the memory 112. As illustrated, the memory 112 is a dual ported RAM. In practice, the memory 112 can take many specific forms, including either a synchronous or asynchronous RAM, and in an exemplary embodiment, is provided as a 256 long-word FIFO of approximately 1 kilobyte in size.

A PUSH command also causes a WRITE COUNT OUTSTANDING register 114, part of the WRITE COUNT TO BE ACK'D circuit 14, to increment by one, reflecting the fact that another data unit has been written, but has not yet been acknowledged by the read side.

Figure 6A:
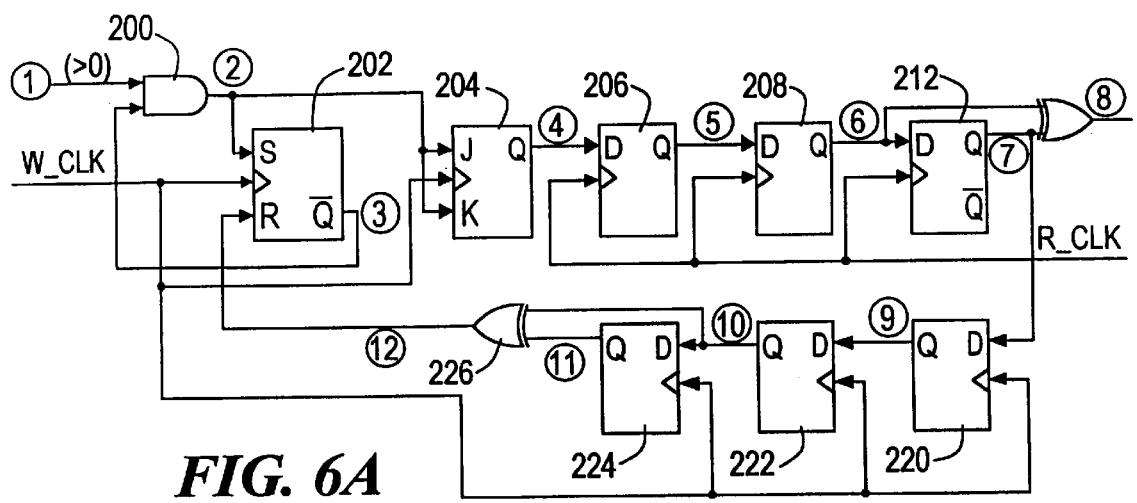
FIG. 6A is a portion of the circuit diagram of FIG. 5.
Figure 6B:
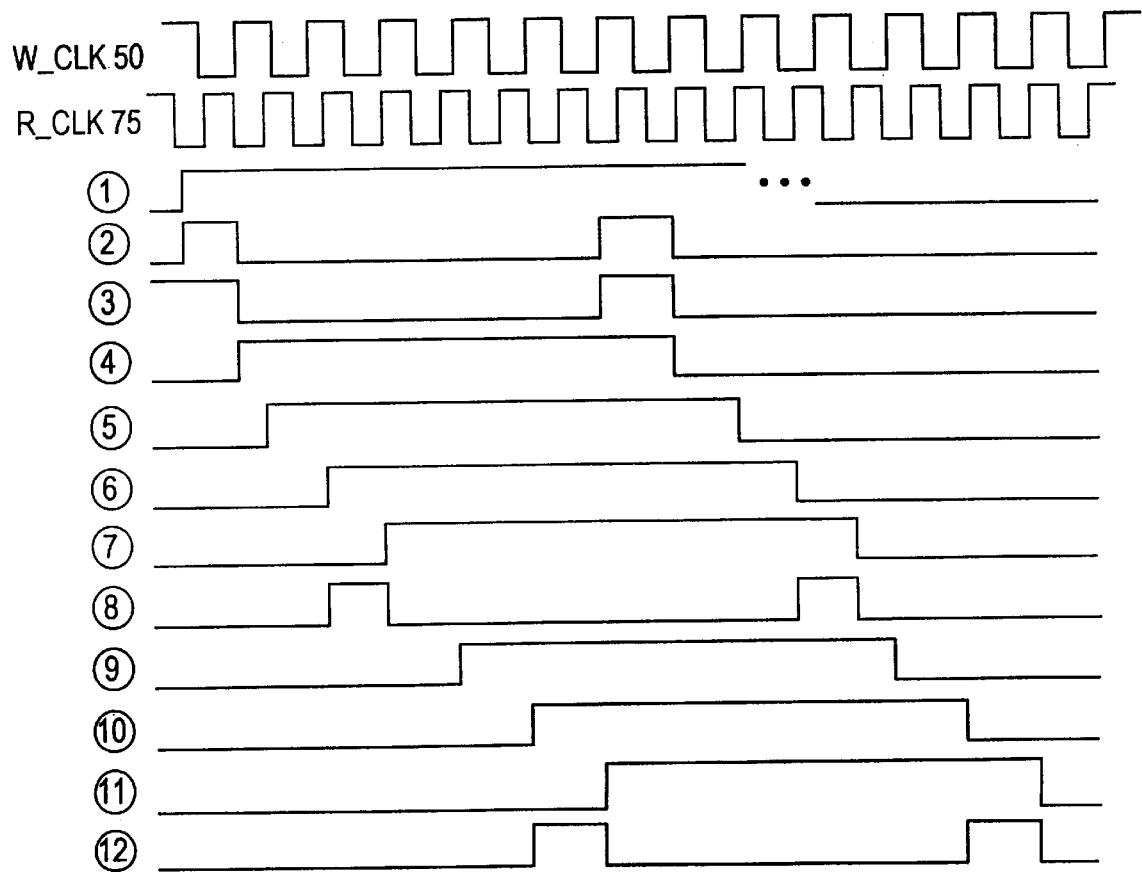
FIG. 6B is a timing diagram for the circuit of FIG. 6A.

Assuming the WRITE COUNT OUTSTANDING register 114 had an initial value of zero, the WRITE COUNT TO BE ACK'D circuit 14, including the WRITE COUNT OUTSTANDING register 114, generates a logic one on the "greater than zero" (">0") output. Reference is also made to the circuit detail and timing diagram of FIGS. 6A and 6B. This is then provided as an input to an AND gate 200 associated with the WRITE TOGGLE circuit 16. The other input to this AND gate 200 is from a Q-inverted output of a write clocked RS flip-flop 202, also part of the WRITE TOGGLE circuit 16. Since the initial output state of the AND gate 200 under these circumstances would be zero (with the ">0" output initially equal to zero), the Q-inverted output of the RS flip-flop is equal to logic one. Thus, when the value of the WRITE COUNT OUTSTANDING register 114 is positive, the output of the AND gate 200 becomes logic one, at least until the next rising edge of the write clock, which causes the Q-inverted output of the RS flip-flop to go to logic zero.

The output of the AND gate 200 is also used as a latch enable for a WRITE COUNT IN FLIGHT register 118. The count registered in the WRITE COUNT OUTSTANDING register 114 is latched into the WRITE COUNT IN FLIGHT REGISTER 118 when the output of the AND gate 200 goes high.

The AND gate 200 output is also used as a common input to a JK flip-flop 204 in the WRITE TOGGLE circuit 16. When both inputs to such a flip flop 204 are high, the Q output also goes high on the next rising edge of the WRITE clock, and remains in that state.

At this point, the WRITE TOGGLE circuit 16 utilizes consecutive D flip flops 206, 208, each clocked by the READ clock, to pass a toggle signal across the clock boundary. As discussed, such a dual flop arrangement avoids the problems associated with a metastable flip flop state, which can occur when a flip flop input is not established for a sufficiently long period prior to a clock rising edge, or if the input does not persist long enough after the clock rising edge. The latter problem is further avoided by the use of the JK flip flop, 204, which maintains its state in the absence of a change in input state.

After at least one READ clock cycle, the Q output of the second read clock D flip flop 208 becomes a logic one, and the NOR gate 210 turns on since the Q output of a third D flip flop 212 of the WRITE TOGGLE circuit 16 is initially logic zero.

A logic one output from the NOR gate 210 enables the output from the WRITE COUNT IN FLIGHT register 118 to be gated by the AND gates 211, part of the WRITE COUNT REC'D circuit 20. The AND gates are shut off on the next read clock cycle by the Q-output of the third read clock D flip flop 212 of the WRITE TOGGLE circuit 16. Thus, the state of the WRITE COUNT OUTSTANDING register 114, as of the time of creation of the write toggle, is provided to the read side circuitry. What is done with this information is described subsequently.

At this point, the read side has been notified of a certain number of data units which were written to the memory 112. Therefore, it is necessary to decrement the WRITE COUNT OUTSTANDING register 114 by the number provided to the read side circuitry along with the write toggle. This is accomplished by the WRITE TOGGLE circuit 16 routing the write toggle back to the write side through a series of write clocked D flip flops 220, 222, 224. These three flip flops 220, 222, 224 perform essentially the same function as the read clock D flip flops 204, 206, 208, namely, to convey the write toggle signal back across the clock boundary. Through the use of the associated NOR gate 226, the toggle is utilized to cause the WRITE COUNT IN FLIGHT register value from the WRITE COUNT AS OF TOGGLE circuit 18 to be transferred back to the WRITE COUNT OUTSTANDING register 114 of the WRITE COUNT TO BE ACK'D circuit 14, where it is decremented from the current number of data units written but not yet acknowledged by the read side. The WRITE COUNT IN FLIGHT register 118 value is then reset to the value of the WRITE COUNT OUTSTANDING register 114, after being decremented, upon issuance of the next write toggle. Thus, any data units which have been written to the memory 112 during the flight of the write toggle are accounted for the next time a write toggle is issued.

The output of the NOR gate 226, which represents the returned write toggle, also causes the RS flip flop 202 to reset in preparation for the next write toggle to issue. This will occur if further data units have been written to the memory 12 and the WRITE COUNT OUTSTANDING register has 114 incremented during the time period when the write toggle was transitioning the WRITE TOGGLE circuit 16, from the write clock domain to the read clock domain and back.

The output of the first, read side NOR gate 210 is utilized to gate the WRITE COUNT IN FLIGHT register 118 value into the read side circuitry, as previously described. It is also used to add that value to the current contents of a WRITE COUNT ACKNOWLEDGED register 120, part of the WRITE COUNT REC'D circuit 20. A positive value in the WRITE COUNT ACKNOWLEDGED register 120 causes a logic one on a "greater than zero" (">0") output to be provided to an AND gate 122, part of the READ CONTROL circuit 22 of FIG. 4. The other input to this AND gate 122 is a inverse-FULL indication, whose generation is described subsequently. When both inputs to the AND gate 122 are logic ones, a DATA AVAIL output from the system 10 is provided, indicating to associated circuitry that at least one data unit is available for reading from the memory 12.

Given such an indication, the associated circuitry is allowed to generate a POP command. One use of the POP command is to increment the READ ADDRESS register 221 associated with the READ CONTROL circuit 22 such that the appropriate data unit in memory 112 is accessed. Another use of the POP command is to decrement the WRITE COUNT ACKNOWLEDGE value which acts as an indication of the number of data units available to be read from the memory 112.

Lastly, the POP command is utilized to increment a READ COUNT OUTSTANDING register 126, part of the READ COUNT TO BE ACK'D circuit 26 of FIG. 4. In many respects, this register 126 serves an analogous function, on the read side, as the WRITE COUNT OUTSTANDING register 114 serves, on the write side. That is, the READ COUNT OUTSTANDING register 126 maintains a number of data units read from memory 112, but not acknowledged by the write side. One output from this register 126 is a FULL indication. When the READ COUNT OUTSTANDING register 126 reaches a value equivalent to the total data unit capacity of the memory 112, this signifies that the WRITE COUNT register 113 value of the WRITE COUNT circuit 13 is at its maximum and the FULL indication is being provided to the circuitry associated with the write side circuitry of the system 10. Thus, it is necessary to stall further reads, or POP commands, until the write side circuitry acknowledges at least a portion of the outstanding number of reads accumulated in the READ COUNT OUTSTANDING register 126.

A positive value in the READ COUNT OUTSTANDING register 126 causes a first input to an AND gate 300 to go to logic one. The second input to this AND gate 300 is connected to a Q-inverted output of an RS flip flop 302 of the READ TOGGLE circuit 28. With the output of the AND gate 300 initially at logic zero, the inverted-Q output of the RS flip flop 302 is at logic one, such that the AND gate 300 turns on.

A first result of the AND gate 300 turning on is that the present value of the READ COUNT OUTSTANDING register 126 is latched into a READ COUNT IN FLIGHT register 130 of the READ COUNT AS OF TOGGLE circuit 30. Thus, the value of the READ COUNT OUTSTANDING register 126 is preserved as of the time of the initiation of a read toggle.

Additionally, the setting of the AND gate 300 output to logic one causes a Q output of a JK flip flop 304 to go to logic one upon the next rising edge of the read clock. Three subsequent D flip flops 310, 312, 314, clocked by the write clock, are utilized to send the read toggle across the clock boundary, just as done by the read clock D flip flops 204, 206, 208 of the WRITE TOGGLE circuit 16.

The Q outputs of the second and third D flip flops 312, 314 are inputs to a NOR gate 316, akin to the NOR gate 210 of the WRITE TOGGLE circuit 16. The output of the NOR gate 316 is utilized to gate the output of the READ COUNT IN FLIGHT register 130 of the READ COUNT AS OF TOGGLE circuit 30 through AND gates 330. The NOR gate 316 output is also used to add the gated value of the READ COUNT IN FLIGHT register 130 to the present value of a READ COUNT ACKNOWLEDGED register 132, part of the READ COUNT REC'D circuit 32 of FIG. 4.

Just as in the WRITE TOGGLE circuit, the read toggle is returned to the read side circuitry in order to decrement the READ COUNT OUTSTANDING register 126 value by the current value in the READ COUNT IN FLIGHT register 130. This is accomplished by providing three read clock D flip flops 320, 322, 324 in the READ TOGGLE circuit 28 for passing the read toggle back into the read clock domain. The Q outputs of the second and third D flip flops 322, 324 are provided to a NOR gate 326 akin to the NOR gate 226 of the WRITE TOGGLE circuit 16, whose output is used to cause the decrementing of the READ COUNT OUTSTANDING register 126, and the resetting of the RS flip flop 302 in preparation for issuance of another read toggle.

Back on the read side, the accumulated value in the READ COUNT ACKNOWLEDGED register 132 is utilized to decrement the WRITE COUNT register 113 value in order to accurately track the number of data units written to the memory 112, but not read therefrom.

The registers illustrated in the accompanying drawings can be implemented in a variety of hardware or software as known to those skilled in the art. Furthermore, the logic illustrated in the WRITE TOGGLE and READ TOGGLE circuitry 16, 28 for initiating and conveying the respective toggle indications across the clock boundaries and for initializing the respective registers capturing the number of data units not acknowledged as of the initiation of the toggle are exemplary of a variety of possible implementations, as long as the respective toggle is returned across the clock boundary to the original clock realm for the purpose of decrementing the number of data units not acknowledged by the number conveyed to the opposite clock realm with the toggle.

These and other examples of the invention illustrated above are intended by way of example and the actual scope of the invention is to be limited solely by the scope and spirit of the following claims.

What is claimed is:

1. A circuit for enabling writing data units to and reading data units from a FIFO at disparate clock frequencies, comprising:

a data unit memory having an input port and an output port;

a write control circuit operating at a first clock frequency; and a read control circuit operating at a second clock frequency, wherein said write control circuit comprises a write count register for maintaining a number of data units written to said memory and not identified as having been read therefrom, a write count to be acknowledged register, in communication with said write count register, for maintaining a number of data units written to said memory but not made available for reading therefrom, a write count ready circuit, in communication with said write count to be acknowledged register and said read control circuit, for issuing an indication to said read control circuit that at least one data unit has been written to said memory and is ready to be read therefrom, and a write count latch register, in communication with said write count to be acknowledged register, said write count ready circuit, and said read control circuit, for maintaining a number of data units written to said memory but not made available for reading therefrom as of issuance of said indication to said read control circuit, and wherein said read control circuit comprises a read count register, in communication with said write control circuit, for maintaining a number of data units written to said memory and ready to be read therefrom, a read count to be acknowledged register for maintaining a number of data units read from said memory but not made available to said write count register for accounting therein, a read count ready circuit, in communication with said read count to be acknowledged register and said write control circuit, for issuing an indication to said write control circuit that at least one data unit has been read from said memory and can be reflected in said write count register, and a read count latch register, in communication with said read count to be acknowledged register, said read count ready circuit, and said write count circuit, for maintaining a number of data units read from said memory but not reflected in said write count register as of issuance of said indication to said write control circuit.

2. A control circuit for a clock-crossing FIFO memory comprising:

a first circuit, in association with said memory, for maintaining, as a first value, a number of data units written to said memory but not yet made available for reading therefrom;

a second circuit, in association with said first circuit, for generating a forward write indication that at least one data unit has been written to said memory;

a third circuit, in association with said first and second circuits, for latching said first value, as of the time at which said forward write indication is generated by said second circuit, as a second value; and a fourth circuit, in communication with said second and third circuits, for maintaining, as a third value, a number of data units written to and made available for reading from said memory but not yet read therefrom, wherein said first, second and third circuits are adapted for operating in synchronism with a first clock signal and said fourth circuit is adapted for operating in synchronism with a second clock signal.

3. The control circuit of claim 3, wherein said fourth circuit further comprises:

a register circuit for holding, as a fourth value, a preexisting number of data units written to and made available for reading from said memory but not yet read therefrom; and an addition circuit for adding said second value to said fourth value to derive said third value.

4. The control circuit of claim 3, wherein said second circuit comprises a forward write clock crossing circuit for providing said forward write indication to said fourth circuit in synchronism with said second clock signal.

5. The control circuit of claim 3, wherein said second circuit is further adapted for providing to said first circuit a reverse write indication that said forward write indication has been received by said fourth circuit.

6. The control circuit of claim 5, wherein said second circuit further comprises a reverse write clock crossing circuit for providing said reverse write indication to said first circuit in synchronism with said first clock signal.

7. The control circuit of claim 6, wherein said first circuit is adapted to respond to assertion of said reverse write indication by subtracting the second value previously latched by said third circuit from the currently maintained first value.

8. The control circuit of claim 2, further comprising:

a fifth circuit, in association with said memory and said first circuit, for maintaining, as a fifth value, a number of data units written to said memory but not yet identified as having been read therefrom;

a sixth circuit, in association with said memory, for maintaining, as a sixth value, a number of data units read from said memory but not yet identified to said fifth circuit for accounting in said fifth value;

a seventh circuit, in association with said sixth circuit, for generating a forward read indication that at least one data unit has been read from said memory; and an eighth circuit, in association with said sixth and seventh circuits, for latching said sixth value, as of the time at which said forward read indication is generated by said seventh circuit, as a seventh value, wherein said fifth circuit is adapted for operating in synchronism with said first clock signal, and wherein said sixth, seventh and eighth circuits are adapted for operating in synchronism with a second clock signal.

9. The control circuit of claim 7, further comprising a ninth circuit, in communication with said fifth, seventh and eighth circuits, for maintaining, as an eighth value, a number of data units read from said memory and made available to said fifth circuit but not yet accounted for in said fifth value by said fifth circuit.

10. The control circuit of claim 9, wherein said ninth circuit further comprises a register circuit for holding a pre-existing number of data units read from said memory and made available to said fifth circuit but not yet accounted for in said fifth value by said fifth circuit, as a ninth value, and an addition circuit for adding said seventh value to said ninth value to derive said eighth value.

11. The control circuit of claim 9, wherein said seventh circuit comprises a forward read clock crossing circuit for providing said forward read indication to said ninth circuit in synchronism with said first clock signal.

12. The control circuit of claim 9, wherein said seventh circuit is further adapted for providing to said sixth circuit a reverse read indication that said forward read indication has been received by said ninth circuit.

13. The control circuit of claim 12, wherein said seventh circuit further comprises a reverse read clock crossing circuit for providing said reverse read indication to said sixth circuit in synchronism with said second clock signal.

14. The control circuit of claim 13, wherein said sixth circuit is adapted to respond to assertion of said reverse read indication by subtracting the seventh value previously latched by said eighth circuit from the currently maintained sixth value.

15. A method for transferring at least one data unit across a clock boundary in an electronic circuit, comprising:

receiving said at least one data unit at a first circuit;

storing, by said first circuit, said at least one data unit in a memory associated therewith;

incrementing, by said first circuit, a first value representative of a number of data units received and stored in said memory but not yet identified as having been read therefrom;

incrementing a second value representative of a number of data units, stored in said memory but not yet made available for reading therefrom, in a second circuit associated with said first circuit;

generating a forward write indicator by a third circuit associated with said second circuit;

latching said second value in a fourth circuit upon generation of said forward write indicator;

adding, by a fifth circuit, upon receipt of said forward write indicator, said latched second value to a third value, representative of a number of data units written to and made available for reading from said memory but not yet read therefrom, previously stored in said fifth circuit, to realize a fourth value, representative of an updated number of data units written to and made available for reading from said memory but not yet read therefrom; and reading a number of data units from said memory, by a sixth circuit, up to a maximum number corresponding to said fourth value.

16. The method of claim 15, further comprising:

generating a reverse write indicator by said third circuit upon receipt of said forward write indicator by said fifth circuit.

17. The method of claim 16 further comprising:

subtracting said latched second value from said second value as stored in said second circuit upon receipt of said reverse write indicator by said second circuit; and providing the result of the subtraction as said second value in said second circuit.

18. The method of claim 15, further comprising:

incrementing, by a seventh circuit associated with said sixth circuit, a fifth value representative of a number of data units read from said memory but not yet made available to said first circuit for accounting in said first value;

generating a forward read indicator by an eighth circuit associated with said seventh circuit;

latching said fifth value in a ninth circuit upon generation of said forward read indicator;

adding, by a tenth circuit upon receipt of said forward read indicator, said latched fifth value to a sixth value, representative of a number of data units read from said memory but not yet made available to said first circuit for accounting in said first value, already stored in said tenth circuit, to realize a seventh value, representative of an updated number of data units read from said memory but not yet made available to said first circuit for accounting in said first value; and decrementing, by said first circuit, said first value by said seventh value.

19. The method of claim 18, further comprising:

generating a reverse read indicator by said eighth circuit upon receipt of said forward read indicator by said tenth circuit.

20. The method of claim 19 further comprising:

subtracting said latched fifth value from said fifth value as stored in said seventh circuit upon receipt of said reverse read indicator by said seventh circuit; and providing the result of the subtraction as said fifth value in said seventh circuit.

* * * * *